United States Patent [19]

Buettner et al.

[11] 4,333,674
[45] * Jun. 8, 1982

[54] VEHICLE BUMPERS WITH COLLAPSIBLE PARTS

[76] Inventors: Carl F. Buettner, 9501 Pinespray, St. Louis, Mo. 63126; John S. Hill, 604 Plaza Dr., Joplin, Mo. 64801

[*] Notice: The portion of the term of this patent subsequent to Sep. 30, 1997, has been disclaimed.

[21] Appl. No.: 121,325

[22] Filed: Feb. 14, 1980

Related U.S. Application Data

[63] Continuation-in-part of Ser. No. 883,829, Mar. 6, 1978, Pat. No. 4,225,167.

[51] Int. Cl.³ .............................................. B60R 19/00
[52] U.S. Cl. .................................................... 293/120
[58] Field of Search ............... 293/139, 117, 102, 120, 293/121, 149, 150, 151, 152, 154, 155

[56] References Cited

U.S. PATENT DOCUMENTS

| | | | |
|---|---|---|---|
| 3,596,963 | 8/1971 | Phillips | 293/150 |
| 3,843,180 | 10/1974 | Alexander | 293/150 |
| 3,884,517 | 5/1975 | Davidson | 293/149 |
| 3,907,352 | 9/1975 | Spain et al. | 293/149 |
| 3,924,888 | 12/1975 | Butcher et al. | 293/149 |
| 4,225,167 | 9/1980 | Buettner et al. | 293/120 |

*Primary Examiner*—Joseph F. Peters, Jr.
*Assistant Examiner*—Ross Weaver
*Attorney, Agent, or Firm*—Haverstock, Garrett & Roberts

[57] ABSTRACT

This invention relates to vehicle bumpers and more particularly to vehicle bumpers with frangible or resiliently collapsible parts which break-away or distort on impact to minimize the loss of control which often occurs when metal and other more usual types of bumpers bend on impact and puncture tires or produce undesirable braking action or become entangled with other parts of the vehicle. This invention is characterized by a vehicle bumper construction wherein at least a portion thereof, and preferably the entire device, is of one-piece construction and is comprised of a frangible and collapsible or otherwise deformable member including a central portion and one or more integral end portions all made of a material such as plastic impregnated fiber glass or rubber-like materials, which end portions extend in front of one or both of the vehicle wheels and fracture and breakoff on impact rather than bend.

17 Claims, 8 Drawing Figures

VEHICLE BUMPERS WITH COLLAPSIBLE PARTS

This is a continuation-in-part of Carl F. Buettner et al patent application Ser. No. 883,829 now Pat. No. 4,225,167, entitled Vehicle Bumpers With Collapsible Parts, filed Mar. 6, 1978.

There are many known bumper constructions for use on vehicles of various types but most of the known bumpers suffer from certain disadvantages and shortcomings including causing blowouts and loss of control of the vehicle on impact. The known devices for the most part are also relatively complicated structurally and expensive to make and install. These disadvantages and shortcomings are especially serious as they relate to bumpers used on larger vehicles such as trucks, buses and the like. The closest known prior art to the present construction are those devices disclosed in U.S. Pat. Nos. 3,596,963, 3,820,834, 3,823,968, 3,843,180, 3,884,517, 3,907,352, 3,924,888 and 4,050,689.

U.S. Pat. No. 3,596,963 discloses a breakable bumper extension device wherein separate bumper end portions are connected by threaded means such as bolts or screws to a central bumper section. In order for the end sections to break off during collision or impact, the extension portions, which are of glass-fiber reinforced polymer, break away from the central section which is described as a conventional metal bumper.

U.S. Pat. No. 3,820,834 discloses a three part bumper supported on a vehicle frame by means of springs. Cantilever-like projections are joined to the outer portions of a central spring loaded bumper section and are held in alignment by means of heavy springs or hydraulic systems. Impact against an end of such a bumper tends to compress the outer projections of the bumper against the action of the springs or hydraulic system so that the projecting portions function like shock absorbers.

U.S. Pat. No. 3,823,968 discloses a bumper for vehicles wherein the bumper includes portions guided in the horizontal plane by scissor-like devices having vertical joints which are connected between the support structure and the bumper. The jointed scissor devices are rigid in the vertical direction but yieldable in the horizontal plane in case of impact. The scissor-like structures are disclosed as being held in place by means of tie rods, tension springs, hydraulic systems, and the like. Such devices are structurally complicated and expensive, and are susceptible to many of the disadvantages mentioned above.

U.S. Pat. No. 3,843,180 discloses a safety-type bumper for use on motor vehicles such as trucks which is characterized by having complementary spring biased end sections pivotally or hingedly mounted on the respective ends of the main body of the bumper. The end portions of this bumper construction may be hingedly attached to the outer ends of the main section by shear pins or bolts which hold the parts together under normal service conditions but allow collapsing of the bumper parts when impacted during collision. This construction is also costly and complicated and has many of the disadvantages discussed above.

U.S. Pat. No. 3,884,517 discloses another bumper construction having end or wing sections coupled to a main bumper section by pins which shear on impact against the wing sections. This construction is further complicated by including tethering cables which prevent the wing sections from falling completely loose when the pins are sheared.

U.S. Pat. No. 3,907,352 discloses a multi-part front truck bumper which has separate end sections that are bolted to a central bumper section, wherein the bolts break on impact. In one embodiment tension springs are included.

U.S. Pat. No. 3,924,888 discloses a bumper construction that has leaf spring connections between the center bumper section and the respective end sections to cause the end sections to be self-restoring to their original conditions after impact.

The construction disclosed in U.S. Pat. No. 4,050,689 is a pneumatic flexible bumper characterized by having a plurality of individual air chambers defined by a resiliently deformable outer bumper shell. The air chambers are formed and defined by supporting elastomeric members separated by elements designed to create a preloading affect which maximizes the resistance to buckling. The elastomeric members are constructed from materials such as dense urethane foam or rubber and are intended to return to their original configuration after impact.

None of the above discussed patents discloses or suggests a bumper that has the main novel features of the present invention which resides in a bumper preferably of one-piece construction having frangible and collapsible or resilient end parts, which bumper is structurally and operationally simple and inexpensive. Furthermore, none of the prior art devices is adaptable to optionally be used in conjunction with a shortened portion of a bumper such as a bumper of known construction.

This invention relates to bumpers especially adaptable for use on heavy vehicles such as semi-trailers and other types of trucks and on buses. Bumpers used on trucks and buses serve some purposes that are somewhat different from the bumpers used on passenger cars and other smaller vehicles. Trucks and bus bumpers are usually supported on the vehicle on relatively heavy structural members and the usual truck and bus bumper may measure up to 8 feet or longer in length to extend across the full front or rear including extending in front of or behind the tires. These heavy duty bumpers are designed to (1) protect the bottom of the radiator tank and shutter controls, (2) add strength to the front cross-members which tie the frame rails together, (3) direct water spray and road debris downwardly toward the road surface in front and under the vehicle, (4) reduce the volume of road spray that is able to enter the engine compartment, (5) provide for the mounting of the license plates, road lights, fog lamps, and other accessories and appurtenances, (6) provide a step for use in checking the water level in the radiator, washing the windshield and for other maintenance, (7) protect the cab skirts and head lamps from damage caused by minor impacts, and, (8) improve the overall appearance of the vehicle.

Statistically, the most vulnerable spot on any moving road vehicle, including trucks and buses, is the left front which for vehicles driven in the U.S. is the corner of the vehicle in front of the driver. The right front corner is the vulnerable corner in certain foreign countries. Many collisions cause the left front portion of the usual metal bumper to bend rearwardly where it moves against and damages or blows out the left front tire or drags on the tire producing a braking action which causes the vehicle to turn to the left into the oncoming lane and also often causes the driver to lose control. The loss of control of the vehicle substantially increases the possibility for further damage from a collision, especially since the braking and other action is more often than not in a direction to divert the vehicle into the adjacent lane and into the lane of oncoming traffic and also causes jack-knifing.

A preferred form of the present invention is characterized by a bumper construction that has frangible collapsible and portions which break-off and fall clear on impact, and in so doing this greatly reduces the danger of blow outs and the possibility that the drive will lose control of the vehicles due to a blow out or due to a bent bumper causing undesirable braking action or other damage to the vehicle. Thus with the present bumper construction the driver of a truck or bus has a much better chance to avoid aggravating a bad situation. This may also reduce damage, injury, and loss of life when an accident occurs. The practice of the present invention is to provide a substantially vertical shear plane in a bumper at a location or locations spaced from one or both ends of the bumper where the bumper will break-away on impact without bending or twisting. Such shear planes are usually about 12 to 18 inches from the ends of the bumpers and the bumper, including especially the end portions thereof, are fabricated from a frangible material such as plastic impregnated fiber glass or other comparable frangible materials which materials are characterized by being relatively strong but which will break-off rather than bend when impacted. The entire bumper including the end portions are preferably fabricated from such materials.

The safety features inherent in the practice of the present invention include:

(1) providing a bumper that has one or more shear planes spaced inwardly from the ends thereof in such a way as to cause the end portions of the bumper to breakoff at the shear planes on impact rather than bending, thereby eliminating the possibility that the bumper will bend against the tire or other vehicle parts and possibly cause a puncture or produce a dragging action on the tire that generates braking and loss of control of the vehicle;

(2) providing a bumper that has sufficient strength and resiliency to withstand minor impacts without damage to the vehicle or to the bumper;

(3) constructing a bumper from materials that can be made in various colors and designs and which can be made to have fluorescent and other safety color characteristics and which does not require painting or other upkeep;

(4) providing a bumper construction which may make use of a shortened portion of an existing bumper such as by being positioned inside of a full length bumper formed of a frangible collapsible material; and, (5) providing a bumper which may in some cases enable the usual metal or wood bumper to continue to be used but in a shortened condition thereby simplifying the installation of the subject construction.

The present invention construction also lends itself to having the usual lights, licenses and other appliances attached to it, and the subject bumper should be made to be strong enough to serve the usual purposes such as to support a man's weight during maintenance and cleaning operation.

The present construction can be constructed to be used with many existing types of truck and bus bumpers as well as with automobile bumpers and the like and it can be made to have different shapes and thicknesses and the present constructions are adaptable to being constructed in many different ways including in a molding process using relatively available materials such as plastic impregnated fiber glass and other plastic and plastic-like substances, and it can be made of rubber or rubber-like substances, all of which are relatively easy to drill into and cut for attaching appliances and for other purposes.

It is therefore a principal object of the present invention to provide a bumper construction having frangible collapsible end portions which are adapted to shear off or break loose as distinguished from bending or twisting on impact.

Another object is to provide a bumper that is preferably constructed as one-piece.

Another object is to provide a bumper construction which can be used with existing, but shortened, versions of known bumper constructions.

It is another object of the present invention to teach the construction of a relatively simple and inexpensive bumper construction.

Another object is to minimize the possibility of puncturing or undesirably braking a tire during a collision.

Another object is to teach the construction of a bumper which is relatively easy to replace and maintain.

Another object is to minimize the damage resulting from an accident involving a road vehicle.

Another object is to increase the possibility that a vehicle involved in an accident will be driveable and controllable after the accident.

Another object is to provide a bumper construction for a vehicle which is particularly adaptable for use on trucks, buses and other relatively heavy vehicles.

Another object is to make the roads and highways safer.

These and other objects and advantages of the present invention will become apparent after considering the following detailed specification in conjunction with the accompanying drawings wherein.

Figure 1:
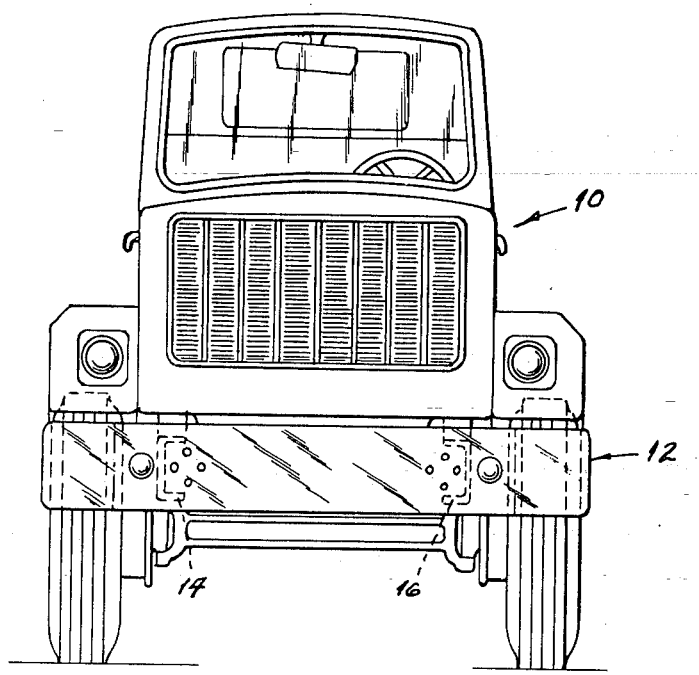
FIG. 1 is a front elevational view of a truck equipped with a bumper constructed according to the teachings of the present invention.

Referring to the drawing more particularly by reference numbers, the number 10, in FIG. 1 identifies a truck or other vehicle equipped with a bumper 12 constructed according to the present invention. The bumper 12 is shown mounted at the front end of the vehicle 10 and is attached thereby by bolts or other fasteners which attach the bumper to spaced vehicle support members 14 and 16 in the usual way. The bumper 12 as more clearly shown in FIG. 2 basically is of two-piece construction including a regular but shortened metal or wood bumper portion 18 which is attached to the vehicle, and a second bumper portion 20 which is mounted on, over or around the portion 18. The details of the member 20 are shown more particularly in FIGS. 2 and 3.

Figure 2:
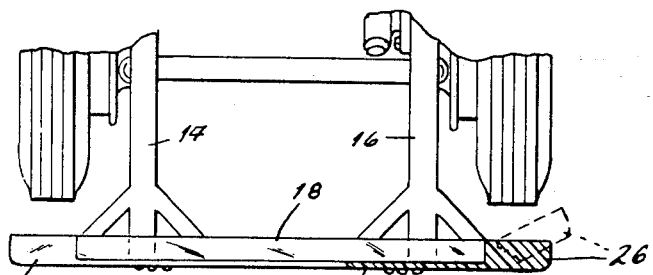
FIG. 2 is a fragmentary top plan view, partly in section, showing the front end of a truck equipped with a bumper constructed according to the present invention.

The bumper portion 18 is shorter in length than the usual bumper that is installed on vehicles so as not to extend completely across the vehicle including in front of, or behind, the tires on opposite sides of the vehicle. In fact, the bumper portion 18 may be even shorter than is shown in FIG. 2 to extend only to the support members 14 and 16. The reason for this is that in case of an impact or collision, it is important that the bumper portion 18 not extend sidewardly far enough so that it could possible be bent backwardly against the tire or other adjacent vehicle portions to cause damage such as to cause a blow-out or to brake a wheel or damage or interfere with other parts. The bumper portion 20, on the other hand, is longer than the portion 18 and is preferably formed of a frangible and collapsible material, and in the construction as shown it has a central relatively thin portion 22 which is positioned adjacent to the short bumper portion 18, and two spaced connected end portions 24 and 26. The portions 22, 24 and 26 are constructed to define a space 28 on one side which is large enough to fit over or receive therein the shortened bumper portion 18. It is important to note that the end portions 24 and 26 extend beyond the ends of the bumper portion 18 in order to establish a full length bumper that extends across the front end of the vehicle including in front of (or behind) the vehicle wheels as clearly shown in FIGS. 1 and 2.

The bumper portion 20 is formed of a relatively frangible and breakable material and the end portions 24 and 26 form shear planes or shear edges at the locations of the respective ends of the bumper portion 18. This is very important because it means that if the bumper 12 is impacted by colliding with another vehicle or object particularly adjacent to either of its ends, the force of the impact, if sufficient as might occur during a collision, will cause the impacted end portion 24 or 26 to shear off or break-off at the location of the associated shear plane. This will usually occur at the location of the respective end of the shorter bumper portion 18. By being of a relatively frangible and breakable material, the bumper portion 20 is incapable of any substantial amount of bending but will crack-off or break-off usually at one of the places indicated. This is to be contrasted with the more usual type bumper which is made entirely like the portion 18, except that in the case of the usual bumper the member 18 extends across the full front (or rear) end of the vehicle so that on impact the impacted end portion will bend, not break, and in bending will move into contact with the tire and other adjacent parts of the vehicle causing braking action of the vehicle or rupturing or puncturing of the tire. These conditions tend to cause the driver to lose control over the vehicle and causes the vehicle to turn in the direction in which the braking action or puncturing occurs. For example, if the front tire on the driver's side is ruptured or braked it is expected that the vehicle will turn, or tend to turn, into the adjacent lane to the driver's left and into the on-coming traffic in the case of two-way traffic. If the turning is too severe it may also cause the vehicle to jacknife. On the other hand, if the opposite end of the front bumper should be impacted, which is less likely though possible especially if the vehicle runs into an object by the side of the road such as a parked vehicle, the vehicle will tend to be turned further toward the side of the road if a puncture or braking action takes place.

Figure 3:
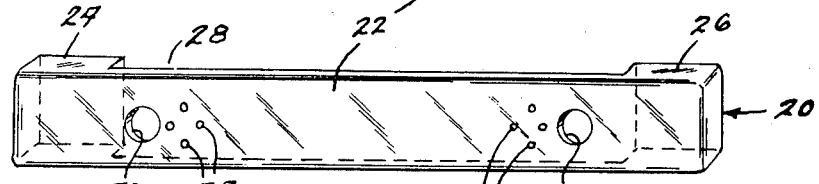
FIG. 3 is a perspective view of a portion of the bumper construction shown in FIGS. 1 and 2.

In the construction shown in FIGS. 1-3 the bumper portion 20 is provided with holes 30 and 32 that accommodate lights or other accessories, and with other holes 34 and 36 which receive fasteners such as bolts or the like used for attaching the bumper portion 20 to the bumper portion 18. The bumper portion 20 can also be provided with means for attaching a license plate and other accessories as well. Furthermore, the bumper portion 20 should be constructed of material that is strong enough to withstand considerable impact without breaking and it should be strong enough to support a relatively considerable load, such as a man's weight, when standing on the bumper to clean the windshield and to perform other operations.

It is possible to make the subject bumper construction 20 in various different sizes, shapes and constructions without changing the nature and scope of the invention. For example, the bumper portion 20 could be constructed to have portions such as flanges that extend along the upper and lower surfaces of the bumper portion 18, it could be constructed to be of equal thickness from end-to-end rather than having the enlarged end portions 24 and 26 since the portion 20 is designed to break-off at the ends of the portions 18, the bumper portion 20 can be notched adjacent to the ends of the member 18, the bumper portion 20 can be made in different thicknesses and different widths, and it can be made of many different frangible collapsible materials such as those indicated. The bumper 20 can also be impregnated during construction with a coloring material and/or with particles of light reflecting material for safety and decoration purposes.

Figure 4:
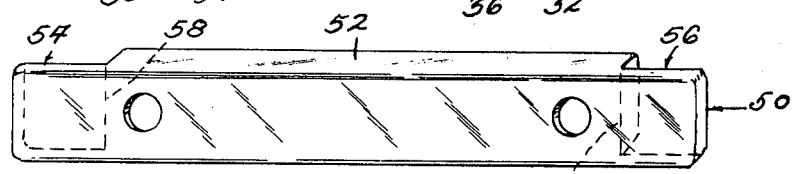
FIG. 4 is a perspective view showing another embodiment of the subject bumper construction.

FIG. 4 shows another bumper embodiment 50 of the subject bumper construction wherein central portion 52 is relatively thick transversely in relation to the thickness of the integral end portions 54 and 56. In this construction, the central portion 52 is attached directly to the front of the vehicle with or without requiring a regular bumper portion such as the shortened bumper portion 18 shown in FIG. 2. In the case of the bumper 50, the end portions 54 and 56 are connected to the central portion 52 at locations 58 and 60 that define shear planes as shown so that on impact the end portions 54 and 56 will breakoff of the locations of shear planes 58 or 60, respectively. The construction shown in FIG. 4 can also be constructed to be hollow so as to receive a bumper portion such as the bumper portion 18 therein or it can be constructed as a member of uniform cross-section along its length with or without flanges extending from the edges of the portion 52. In either case, the operation will be the same in that on impact the end portions will be sheared or broken-off instead of being bent or twisted. The length of the end portions 54 and 56 can be selected as desired and as necessary depending upon the amount to be sheared off on impact.

Figure 5:
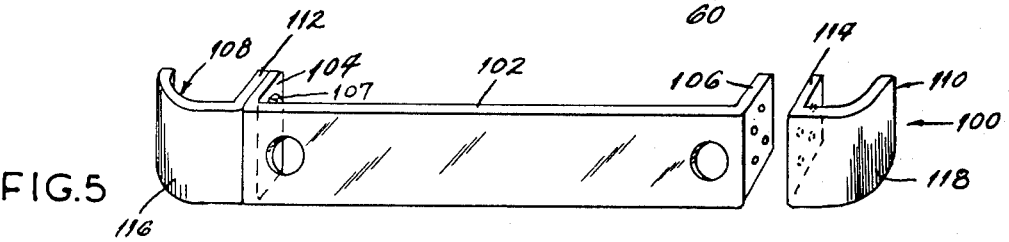
FIG. 5 is a perspective view showing still another embodiment of the subject bumper construction.

FIG. 5 shows yet another bumper embodiment 100 which includes a central portion 102 with flanged end portions 104 and 106. The length of the portion 102 is selected to correspond to the length of a portion such as the portion 18 in FIG. 2. In the construction of FIG. 5 the end flanges 104 and 106 are connected to separate members 108 and 110 which are shown as flanged members having respective first flanges 112 and 114 which are attached to the flanges 104 and 106 by suitable fastener means such as nuts and bolts 107 and the like, and the members 108 and 110 have other flange portions 116 and 118 which extend endwardly and rearwardly to form the end portions of the bumper construction 100. The members 108 and 110 may be constructed of a frangible breakable material such as in the constructions shown in FIGS. 1-4 or they may be constructed of a material such as a relatively stiff but somewhat flexible substance such as a relatively stiff rubber or rubber-like material capable of bending to some extent without breaking. In any case, however, the members 108 and 110 should not be capable of moving into contact with the associated vehicle wheels to produce a rubbing or braking action on the wheel or to rupture or puncture the tire. The shape and the dimensions of the various parts used in the bumper construction 100 can be varied as desired without departing from the spirit and scope of the invention, and it is contemplated that the members 108 and 110 be made of a material capable of yielding without breaking under some loads but capable of breaking when greater forces are applied.

Figure 6:
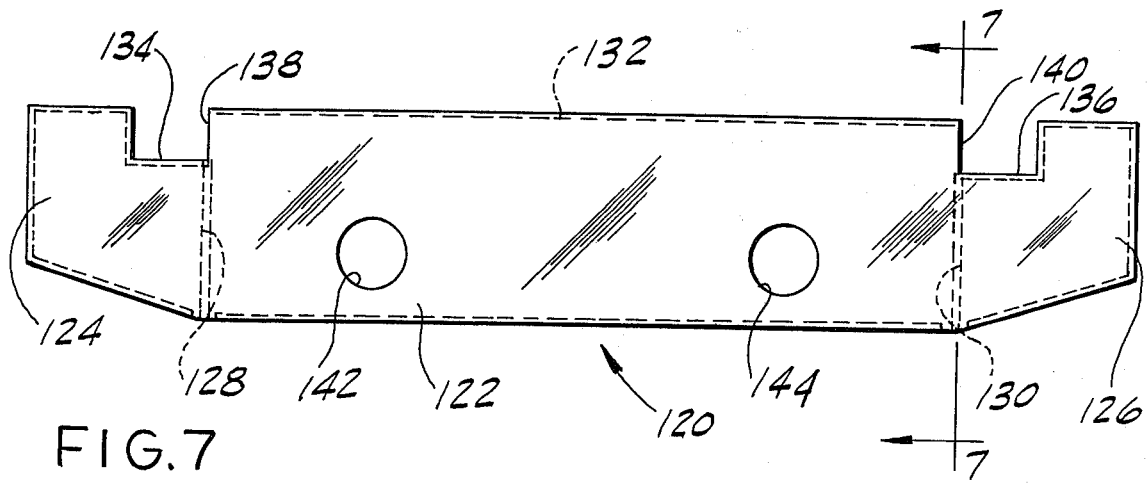
FIG. 6 is a front view of yet another embodiment of the present invention.
Figure 7:
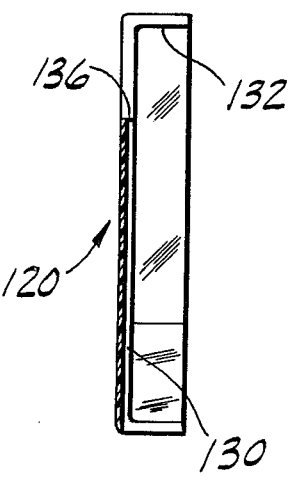
FIG. 7 is a cross-sectional view taken on line 7—7 of FIG. 6.
Figure 8:
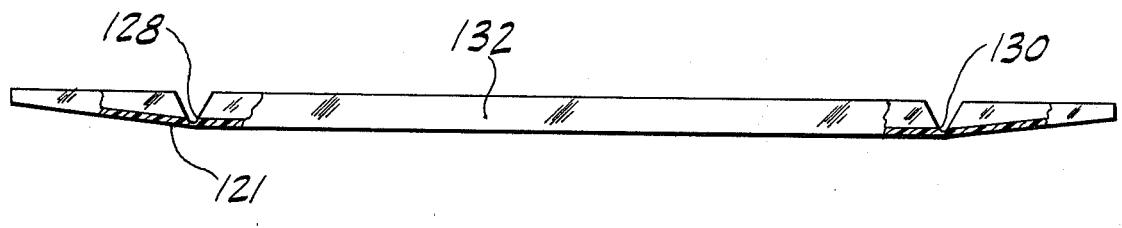
FIG. 8 is a top view partly cut away and sectioned of the bumper of FIG. 6.

FIGS. 6-8 show yet another embodiment 120 of a one-piece bumper which is constructed to extend across the width of a vehicle including in front of the tires. The construction 120 preferably is of uniform thickness along most of its length, and includes a central section 122 for attaching to the vehicle, and integral end sections 124 and 126 connected to opposite ends of the center section 122 at reduced cross-section locations shown formed by grooves or channels 128 and 130 that extend the width thereof. The grooves 128 and 130 are preferably located on the side of the bumper that faces the vehicle when installed, although they could be located on the exposed surface as well. When located on the exposed surface at the front of the vehicle it has been found that some vibrations may occur expecially at high speed or under high wind conditions. It is also contemplated, although usually not preferred, to groove the bumper 120 from both opposite sides although if this is done it may not prevent the vibration problem. The important thing is that the bumper 120 be of one-piece construction, that it be constructed of a relatively strong frangible material, and that it have weakened areas or regions forming relatively abrupt connections between adjacent portions where the end portions will fracture and break off rather than bend on impact.

The bumper construction 120 as shown in FIGS. 6-8 includes a uniformed thickness wall member 121 which extends the length thereof but is weakened between the portions 124, 122 and 126 by the grooves or channels 128 and 130. The wall member 121 in the preferred construction also has optional peripheral flanges 132 which extend around most of the edge thereof on one side which is shown. The bumper 120 is shown having spaced cut-outs or notches 134 and 136 located in the upper surface thereof near to the opposite ends. The cutouts 134 and 136 form shoe rests where a person can place his shoe while he is cleaning the windshield, or performing other maintenance. The shoe rests are a safety provision which prevents the person's shoe from slipping or sliding along on the upper surface of the bumper.

The optional edge flanges 132 which extend from the bumper including along the shoe steps 1234 and 136 are interrupted at locations 138 and 140 which are the locations where the grooves 128 and 130 are formed. This is done so that the weakening of the bumper by the grooves 128 and 130 will be uniform across the bumper 120 to facilitate a clean break-off of the end portions 124 and 126 on impact. The same may be true of the portions of the flanges 132 which extends along the lower edge of the bumper.

The bumper 120 has openings 142 and 144 which are provided to accommodate fog lights or other appliances, and the locations of the openings 142 and 144 is selected so that they are not at locations where any of the possible holes will be located that will be needed to fasten the bumper to a vehicle. This is an important practical consideration because most known existing over the road vehicles such as large trucks and the like have the locations for their bumper mounting bolts at various different positions. Therefore, by properly locating the holes 142 and 144 in a bumper of the type shown in FIGS. 6-8, other holes for the fasteners can be drilled in it at suitable locations to accommodate the mounting means on most known transport trucks and buses.

Thus there has been shown and described several different embodiments of a bumper construction, and particularly a bumper construction for use on relatively large vehicles such as on trucks and buses, which fulfills all of the objects and advantages sought therefor. It will be apparent to those skilled in the art, however, that many changes, modifications, variations, and other uses and applications of the subject bumper construction are possible. All such changes, modifications, variations and other uses and applications which do not depart from the spirit and scope of the invention are deemed to be covered by the invention which is limited only by the claims which follow.

What is claimed is:

1. A one-piece bumper for mounting on a vehicle having a predetermined width comprising a main body section for connecting to the vehicle and end sections connected integrally to the main body section, said main body section including said integrally connected end sections having an overall length to extend substantially across the width of the vehicle, means forming an integral connection between the main section and each of the end sections including a groove defining a location of substantially reduced cross-section therebetween, said main body section and said end sections having relatively uniform thickness along the length thereof but being substantially less thick at the locations of said grooves, said main body section and said integral end sections being constructed of a frangible material whereby said end sections are more likely to break away from said main body section at the locations of the respective grooves on impact rather than to bend.

2. The bumper of claim 1 wherein said main body section and said end sections are formed of laminated plastic impregnated fibers.

3. The bumper of claim 2 wherein the plastic is a polyester-epoxy resin and the fibers are fiber glass.

4. The bumper of claim 1 wherein the main body section and the end sections are of substantially the same thickness along their lengths.

5. A one piece bumper for mounting on a vehicle having a predetermined width comprising a main body section and end sections connected integrally to the main body section, said main body section including said integrally connected end sections having a length to extend across the width of the vehicle, said end sections and said main body section having substantially different cross-sectional sizes at the locations of their connections to form relatively abrupt integral connections therebetween, said main body section having a relatively uniform cross-section along its length and being substantially larger in cross-section than the end sections, said main body section and end sections being constructed of a frangible material, each of said end sections being adapted upon impact to break away from said main body section adjacent to the respective abrupt integral connection therewith rather than to bend.

6. A vehicle bumper according to claim 5 wherein the end sections extend in front of the respective vehicle wheels.

7. A vehicle bumper according to claim 5 wherein said end sections are fabricated from a relatively light weight frangible, collapsible material.

8. A vehicle bumper according to claim 7 wherein said end sections are formed of laminated plastic impregnated fibers.

9. A vehicle bumper according to claim 8 wherein the plastic is a polyester-epoxy resin and the fibers are fiber glass.

10. A bumper comprising a member having a central portion and integral endwardly extending portions, said central portion having a greater cross sectional size and shape than the end portions, and means forming relatively abrupt integral connections between the central portion and the respective end portions to define locations for potential fracture, said member being formed of a relatively frangible substance that is more likely on impact to break than to bend.

11. A bumper for mounting on a vehicle comprising an elongated one-piece member constructed of a relatively strong, frangible material that is relatively more likely to break on impact than to bend, said member including an elongated central portion for attaching to the vehicle, said central portion having spaced opposite ends, and end portions including means connecting the end portions integrally to respective opposite ends of the central portion, the connection between each of said end portions and the central portion defining an integral location of reduced cross-section forming a shear plane where the end portions will break off from the central portion rather than bend on impact.

12. The bumper of claim 11 wherein the means connecting the respective end portions to the central portion includes grooves formed in the elongated member at the respective locations therebetween, the cross-section of the bumper at the locations of said grooves being substantially less than the cross-sectional sizes of the central portion and of the end portions adjacent thereto.

13. The bumper of claim 11 wherein the end portions have a different cross-sectional size than the cross-sectional size of the central portion.

14. A bumper for vehicles comprising an elongated one-piece member for attaching to a vehicle, said elongated member including a wall member of relatively uniform thickness along the length thereof, said wall member having transverse grooves extending thereacross at locations spaced inwardly from each opposite end thereof to define a central bumper portion and integral connected end portions, said grooves weakening the elongated member at the locations thereof so that the end portions will break off on impact rather than bend.

15. The bumper of claim 14 wherein said elongated member has a flange extending from one side thereof and extending substantially around the periphery thereof.

16. The bumper of claim 15 wherein said grooves extend through the peripheral flange on opposite sides of the elongated member.

17. The bumper of claim 15 including means formed in said elongated member adjacent one side thereof forming a shoe rest for accommodating the shoe of a person standing on the bumper.

* * * * *

UNITED STATES PATENT OFFICE
CERTIFICATE OF CORRECTION

Patent No. 4,333,674  Dated  June 8, 1982

Inventor(s) Carl F. Buettner & John S. Hill

It is certified that error appears in the above-identified patent and that said Letters Patent are hereby corrected as shown below:

Column 3, line 9 "and" should be --end--

Column 3, line 11 "drive" should be --driver--

Column 3, line 59 delete "invention"

Column 7, line 63 "1234" should be --134--

Signed and Sealed this

Tenth Day of August 1982

[SEAL]

Attest:

Attesting Officer

GERALD J. MOSSINGHOFF

Commissioner of Patents and Trademarks